United States Patent
Eom (10) Patent No.: US 9,885,607 B2
(45) Date of Patent: Feb. 6, 2018

(54) APPARATUS AND METHOD FOR MEASURING REFERENCE SPECTRUM FOR SAMPLE ANALYSIS, AND APPARATUS AND METHOD FOR ANALYZING SAMPLE

(71) Applicant: SAMSUNG ELECTRONICS CO., LTD., Suwon-si (KR)

(72) Inventor: Kun Sun Eom, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/241,762

(22) Filed: Aug. 19, 2016

(65) Prior Publication Data

US 2017/0059409 A1    Mar. 2, 2017

(30) Foreign Application Priority Data

Aug. 24, 2015    (KR) .................. 10-2015-0119044

(51) Int. Cl.
*G01J 3/42*    (2006.01)
*G01J 3/10*    (2006.01)
(Continued)

(52) U.S. Cl.
CPC ................ *G01J 3/42* (2013.01); *G01J 3/027* (2013.01); *G01J 3/10* (2013.01); *G01J 3/28* (2013.01);
(Continued)

(58) Field of Classification Search
CPC ................ G01J 2003/2873; G01J 3/42; G01J 2003/425; G01J 3/027; G01J 3/10;
(Continued)

(56) References Cited

U.S. PATENT DOCUMENTS 6,006,119 A * 12/1999 Soller ................ A61B 5/14535
                                                356/39
6,529,767 B1    3/2003 Woo et al.
(Continued)

FOREIGN PATENT DOCUMENTS

KR        10-0775669 B1    11/2007
KR    10-2014-0084419 A     7/2014

*Primary Examiner* — Kara E Geisel
*Assistant Examiner* — Violeta A Prieto
(74) *Attorney, Agent, or Firm* — Sughrue Mion, PLLC (57) ABSTRACT

An apparatus for measuring a reference spectrum includes a parameter adjuster configured to adjust a parameter of a spectroscope so that an intensity of a reflection spectrum of a sample has a value in a range, a reference material spectrum measurer configured to adjust reflectance of a reference material so an intensity of a reflection spectrum of the reference material is not saturated, and measure the reflection spectrum of the reference material, using the spectroscope having the adjusted parameter, a first reference spectrum calculator configured to, in response to the adjusted reflectance of the reference material not being one hundred percent, calculate a first reference spectrum based on the measured reflection spectrum of the reference material, and a second reference spectrum measurer configured to measure a second reference spectrum of the reference material, using the spectroscope having the adjusted parameter, when a light source of the spectroscope is turned off.

20 Claims, 7 Drawing Sheets

(51) Int. Cl.
*G01J 3/02* (2006.01)
*G01J 3/28* (2006.01)

(52) U.S. Cl.
CPC . *G01J 2003/2873* (2013.01); *G01J 2003/425* (2013.01)

(58) Field of Classification Search
CPC ..... G01J 3/28; A61B 5/0075; G01N 21/3563; G01N 2201/127; G01N 2201/12707; G01N 2201/12715; G01N 2201/12769
See application file for complete search history.

(56) References Cited

U.S. PATENT DOCUMENTS

| | | |
|---|---|---|
| 7,203,345 B2 | 4/2007 | Rowe et al. |
| 7,299,080 B2 | 11/2007 | Acosta et al. |
| 7,313,427 B2 | 12/2007 | Benni |
| 8,260,389 B2 | 9/2012 | Stothers et al. |
| 2008/0079943 A1* | 4/2008 | Li .................. G01N 21/4785 356/445 |
| 2009/0118601 A1 | 5/2009 | Rabolt et al. |
| 2010/0177309 A1 | 7/2010 | Scaiano et al. |
| 2010/0193706 A1* | 8/2010 | Shen .................. G01J 3/26 250/474.1 |
| 2011/0218739 A1* | 9/2011 | Mo .................. G01N 21/85 702/23 |
| 2014/0236021 A1 | 8/2014 | Islam |

\* cited by examiner

APPARATUS AND METHOD FOR MEASURING REFERENCE SPECTRUM FOR SAMPLE ANALYSIS, AND APPARATUS AND METHOD FOR ANALYZING SAMPLE

CROSS-REFERENCE TO RELATED APPLICATION

This application claims priority from Korean Patent Application No. 10-2015-0119044, filed on Aug. 24, 2015 in the Korean Intellectual Property Office, the disclosure of which is incorporated herein by reference in its entirety.

BACKGROUND

1. Field

Apparatuses and methods consistent with exemplary embodiments relate to spectrum measurement technology, and more specifically, to an apparatus and method for measuring reference spectrums for a sample analysis, and an apparatus and method for analyzing a sample.

2. Description of the Related Art

An infrared spectroscope is an efficient apparatus radiating infrared rays on samples, and detecting the light penetrated or reflected therefrom to analyze the structure of the samples, thereby discovering the properties of the samples. The infrared spectroscope is capable of precisely measuring and analyzing a trace of a sample only when maximizing a signal to noise ratio (SNR) of the sample spectrum.

If a size of a signal being measured is small due to the high absorbance thereof like skin, the SNR of a skin spectrum is also small, which causes difficulties in accurately measuring and analyzing a sample.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide an apparatus and method for measuring reference spectrums for a sample analysis, and an apparatus and method for analyzing a sample.

According to an aspect of an exemplary embodiment, there is provided an apparatus for measuring a reference spectrum for a sample analysis, the apparatus including a parameter adjuster configured to adjust a parameter of a spectroscope so that an intensity of a reflection spectrum of a sample to be analyzed by the spectroscope has a value in a range. The apparatus further includes a reference material spectrum measurer configured to adjust reflectance of a reference material so that an intensity of a reflection spectrum of the reference material is not saturated, and measure the reflection spectrum of the reference material, using the spectroscope having the adjusted parameter. The apparatus further includes a first reference spectrum calculator configured to, in response to the adjusted reflectance of the reference material not being one hundred percent, calculate a first reference spectrum based on the measured reflection spectrum of the reference material, and a second reference spectrum measurer configured to measure a second reference spectrum of the reference material, using the spectroscope having the adjusted parameter, in response to a light source of the spectroscope being turned off.

The range may be determined to maximize a performance of the spectroscope.

The parameter of the spectroscope may include any one or any combination a preamp coefficient of the light source, an integration time of the light source, a scan number of the light source, and a resolution of the light source.

The reference material may include a first plate where a fully reflective material is applied, and a second plate where a light-absorbing material is applied as a pattern, the first plate overlapping the second plate to slide together, and the reference material spectrum measurer may be further configured to adjust the reflectance of the reference material through the first plate and the second plate sliding together.

The reference material may include a fully reflective material, and a film disposed on the fully reflective material and configured to adjust a transparency of the fully reflective material, and the reference material spectrum measurer may be further configured to adjust the reflectance of the reference material by adjusting the transparency of the film.

The reference material spectrum measurer may be further configured to adjust the reflectance of the reference material by reducing a number of light sources of the spectroscope to be used in the measurement of the reflection spectrum of the reference material, or readjusting the adjusted parameter of the spectroscope.

The first reference spectrum calculator may be further configured to calculate the first reference spectrum, using a conversion formula defining a relation of a spectrum depending on reflectance.

According to an aspect of another exemplary embodiment, there is provided a method of measuring a reference spectrum for a sample analysis, the method including adjusting a parameter of a spectroscope so that an intensity of a reflection spectrum of a sample to be analyzed by the spectroscope has a value in a range, adjusting reflectance of a reference material so that an intensity of a reflection spectrum of the reference material is not saturated, and measuring the reflection spectrum of the reference material, using the spectroscope having the adjusted parameter. The method further includes in response to the adjusted reflectance of the reference material not being one hundred percent, calculating a first reference spectrum based on the measured reflection spectrum of the reference material, and measuring a second reference spectrum of the reference material, using the spectroscope having the adjusted parameter, in response to a light source of the spectroscope being turned off.

The range may be determined to maximize a performance of the spectroscope.

The parameter of the spectroscope may include any one or any combination a preamp coefficient of the light source, an integration time of the light source, a scan number of the light source, and a resolution of the light source.

The reference material may include a first plate where a fully reflective material is applied, and a second plate where a light-absorbing material is applied as a pattern, the first plate overlapping the second plate to slide together, and the adjusting of the reflectance of the reference material may include adjusting the reflectance of the reference material through the first plate and the second plate sliding together.

The reference material may include a fully reflective material, and a film disposed on the fully reflective material and configured to adjust a transparency of the fully reflective material, and the adjusting of the reflectance of the reference material may include adjusting the reflectance of the reference material by adjusting the transparency of the film.

The adjusting of the reflectance of the reference material may include adjusting the reflectance of the reference material by reducing a number of light sources of the spectroscope to be used in the measurement of the reflection spectrum of the reference material, or readjusting the adjusted parameter of the spectroscope.

The calculating of the first reference spectrum may include calculating the first reference spectrum, using a conversion formula defining a relation of a spectrum depending on reflectance.

According to an aspect of another exemplary embodiment, there is provided an apparatus for analyzing a sample, the apparatus including a parameter adjuster configured to adjust a parameter of a spectroscope so that an intensity of a reflection spectrum of a sample to be analyzed by the spectroscope has a value in a range, and a sample spectrum measurer configured to measure the reflection spectrum of the sample, using the spectroscope having the adjusted parameter. The apparatus further includes a reference material spectrum measurer configured to adjust reflectance of a reference material so that an intensity of a reflection spectrum of the reference material is not saturated, and measure the reflection spectrum of the reference material, using the spectroscope having the adjusted parameter. The apparatus further includes a first reference spectrum calculator configured to, in response to the adjusted reflectance of the reference material not being one hundred percent, calculate a first reference spectrum based on the measured reflection spectrum of the reference material, and a second reference spectrum measurer configured to measure a second reference spectrum of the reference material, using the spectroscope having the adjusted parameter, in response to a light source of the spectroscope being turned off. The apparatus further includes a calculator configured to calculate any one or any combination of transmittance, reflectance, or absorbance based on the reflection spectrum of the sample, the first reference spectrum, and the second reference spectrum.

The range may be determined to maximize a performance of the spectroscope.

The parameter of the spectroscope may include any one or any combination a preamp coefficient of the light source, an integration time of the light source, a scan number of the light source, and a resolution of the light source.

The reference material may include a first plate where a fully reflective material is applied, and a second plate where a light-absorbing material is applied as a pattern, the first plate overlapping the second plate to slide together, and the reference material spectrum measurer may be further configured to adjust the reflectance of the reference material through the first plate and the second plate sliding together.

The reference material may include a fully reflective material, and a film disposed on the fully reflective material and configured to adjust a transparency of the fully reflective material, and the reference material spectrum measurer may be further configured to adjust the reflectance of the reference material by adjusting the transparency of the film.

The reference material spectrum measurer may be further configured to adjust the reflectance of the reference material by reducing a number of light sources of the spectroscope to be used in the measurement of the reflection spectrum of the reference material, or readjusting the adjusted parameter of the spectroscope.

BRIEF DESCRIPTION OF THE DRAWINGS

The above and/or other aspects will be more apparent by describing exemplary embodiments with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

In addition, the terms such as "unit," "-er (-or)," and "module" described in the specification refer to an element for performing at least one function or operation, and may be implemented in hardware, software, or the combination of hardware and software.

Figure 1:
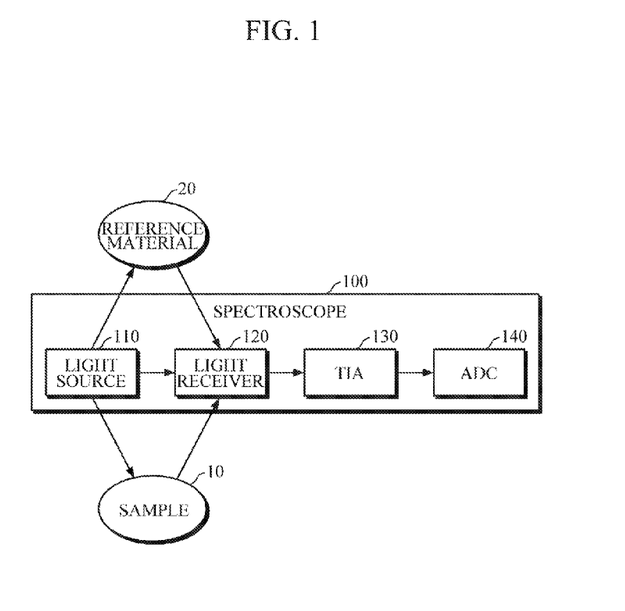
FIG. 1 is a diagram illustrating a spectroscope according to an exemplary embodiment.

FIG. 1 is a diagram illustrating a spectroscope according to an exemplary embodiment.

Referring to FIG. 1, a spectroscope 100 includes a light source 110, a light receiver 120, a trans-impedance amplifier (TIA) 130, and an analog-digital converter (ADC) 140.

The light source 110 may irradiate light on a sample 10 or a reference material 20, and the light receiver 120 may detect the scattered or reflected light from the sample 10 or the reference material 20. Here, the intensity of the light detected by the light receiver 120 may be represented as a current signal.

The light source 110 may include a light emitted diode (LED) or a laser diode. The light receiver 120 may include a photodiode, a phototransistor (PTr), or a charge-coupled device (CCD).

The TIA 130 may amplify the light (the current signal) that is detected by the light receiver 120, and convert the amplified light to a voltage signal.

The ADC 140 may convert the voltage signal, which has been acquired by the TIA 130, to a digital voltage signal.

A performance of the spectroscope 100 may depend on the performance of the ADC 140. For example, a spectroscope having a 16-bit ADC is capable of using an ADC value of 0 to 65535. In other words, the spectroscope having the 16-bit ADC (hereinafter, referred to as '16-bit spectroscope') is capable of measuring an intensity of an ADC value of 0 to 65535.

Figure 2:
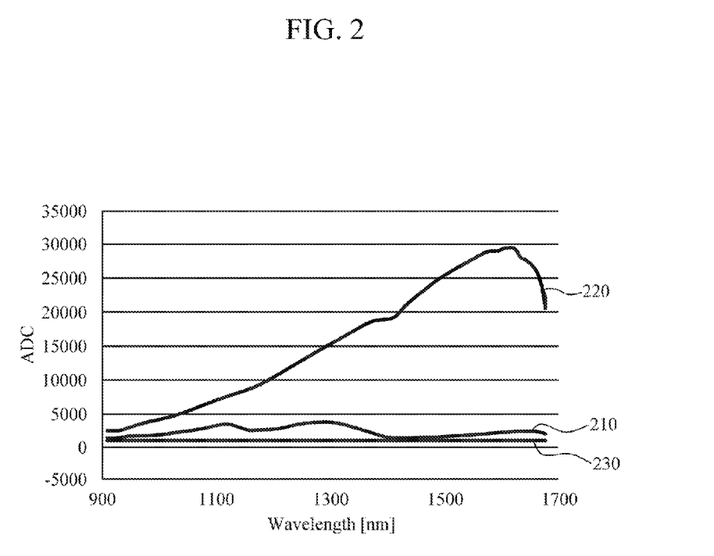
FIG. 2 is a diagram illustrating reference spectrums being used in a skin spectrum and an analysis thereof, according to an exemplary embodiment.

FIG. 2 is a diagram illustrating reference spectrums being used in a skin spectrum and an analysis thereof, according to an exemplary embodiment. FIG. 2 illustrates an example of a skin spectrum 210 and reference spectrums 220 and 230, which are measured using a 16-bit spectroscope.

When samples are analyzed using the spectroscope 100, the transmittance, reflectance, absorbance, etc. of the samples are measured to perform a statistical analysis. Here, to measure the transmission, reflectance, absorbance, etc., the spectrum and reference spectrums of the samples are measured.

The measurement of the reference spectrums is performed through a measurement of the spectrums of the reference material 20. The reference spectrums include first and second reference spectrums. Here, the first reference spectrum is the spectrum of the reference material 20 having one-hundred-percent (100%) transmittance or reflectance; and the second reference spectrum, a spectrum of the reference material 20 having zero percent (0%) transmittance or reflectance.

After light is irradiated on a reference material (a fully reflective material) having one-hundred-percent reflectance in the same condition (a spectroscope parameter, a distance between the reference material and a spectroscope, etc.) as the one when the sample spectrum is measured, a light receiver 120 detects the reflected light from the reference material, thereby measuring the reference spectrums.

The second reference spectrum may be measured through the light detected by the light receiver 120 in a state in which the light source 110 is turned off.

For example, the reference material (fully reflective material) having one-hundred-percent reflectance may be Teflon, mirror, or the like, but it is not limited thereto.

However, a transmittance of a sample (T) may be measured using Equation 1, and an absorbance thereof (A) may be measured using Equation 2.

$$T = \frac{I_s - I_{dark}}{I_{back} - I_{dark}}$$ [Equation 1]

Here, $I_s$ indicates an intensity of a sample spectrum; $I_{dark}$, an intensity of a second reference spectrum; and $I_{back}$, an intensity of a first reference spectrum.

[Equation 2]

$$A = -\log_{10} T$$

The 16-bit spectroscope may use an ADC value of 0 to 65535. As illustrated in FIG. 2, the first reference spectrum 220 may have an ADC value of approx. 2500 to 30000; and the second reference spectrum 230, an ADC value of approx. 900. Accordingly, the skin spectrum 210, which will be measured, may be measured only using almost a half of the performance of the spectroscope. The absorbance of skin is high, so that the measured skin spectrum 210 has an ADC value less than '5000'.

Accordingly, in a case of the example illustrated in FIG. 2, only one twelfth of the performance of the spectroscope is used in measuring the transmittance, reflectance, or absorbance of skin.

Figure 3:
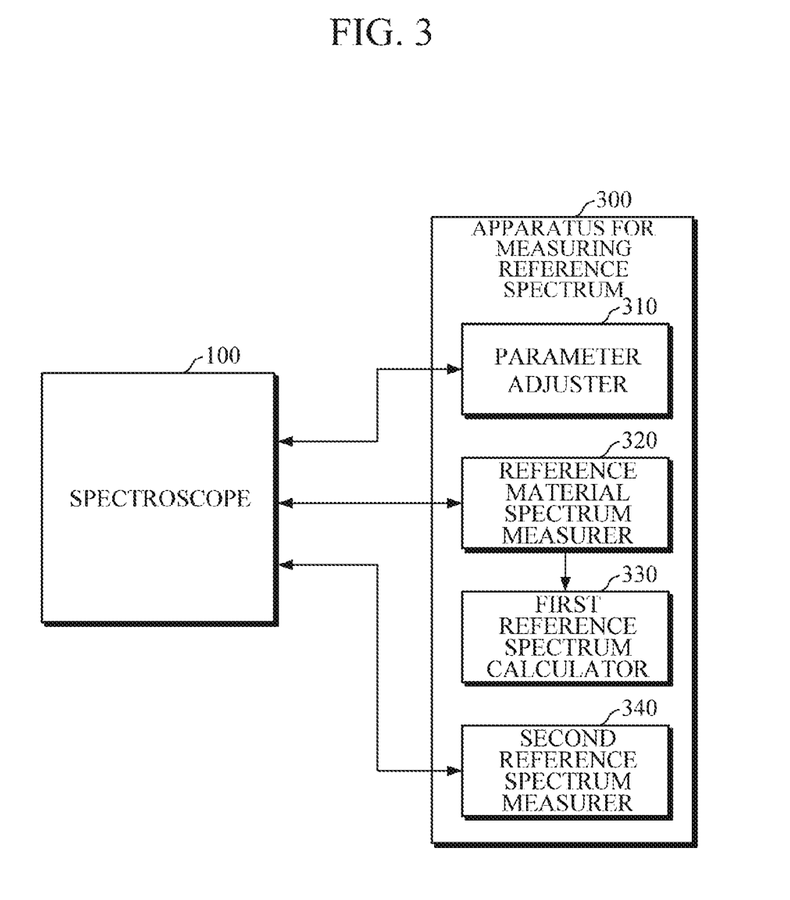
FIG. 3 is a diagram illustrating an apparatus of measuring reference spectrums, according to an exemplary embodiment.

FIG. 3 is a diagram illustrating an apparatus of measuring reference spectrums, according to an exemplary embodiment.

An apparatus 300 for measuring reference spectrums may measure reference spectrums (the first and second reference spectrums) to use the performance of a spectroscope when measuring a spectrum for an analysis of samples.

Referring to FIG. 3, the apparatus 300 includes a parameter adjuster 310, a reference material spectrum measurer 320, a first reference spectrum calculator 330, and a second reference spectrum measurer 340.

The parameter adjuster 310 may adjust a parameter of a spectroscope so that an intensity of a reflection spectrum of the sample has a value in a predetermined range. Here, the parameter of the spectroscope may include a preamp coefficient of the light source, an integration time thereof, a scan number thereof, a resolution thereof, etc.

The predetermined range may be determined in advance to use a performance of a spectroscope. For example, if it is assumed to be a 16-bit spectroscope, the spectroscope is capable of using an ADC value of 0 to 65535. Even if it is the same kind of sample (e.g., skin), there are subtle differences depending on samples. Thus, in consideration to these differences, if the intensity of the reflection spectrum of the sample has an ADC value of 0 to 55000, it is possible to use a performance of the spectroscope. Accordingly, it may be determined that the predetermined range to use the performance of the spectroscope is an ADC value of 0 to 55000, and the parameter adjuster 310 may adjust the parameter of the spectroscope so that the intensity of the reflection spectrum of the sample has an ADC value of 0 to 55000.

The parameter adjuster 310 may adjust a distance between the spectroscope 100 and a sample, i.e., a measurement distance, so that the intensity of the reflection spectrum of the sample has a value in a predetermined range. In other words, the parameter adjuster 310 may adjust a parameter of the spectroscope, as well as adjusting a distance between the spectroscope 100 and the sample, so that the intensity of the reflection spectrum of the sample has a value in a predetermined range.

The reference material spectrum measurer 320 may adjust reflectance of the reference material so that the intensity of the reflection spectrum of the reference material is not saturated.

If the parameter is adjusted by the spectroscope 100 to increase the intensity of the sample spectrum, the intensity of the first reference spectrum also rises. Thus, depending on the situation, the intensity of the first reference spectrum exceeds a range that the spectroscope 100 can measure, thereby causing the saturation thereof. Accordingly, the reference material spectrum measurer 320 adjusts the reflectance of the reference material so that the intensity of the reflection spectrum of the reference material is not saturated. For example, if the reference material has reflectance of 100%, the reflection spectrum of the reference material is measured using the spectroscope 100 whose parameter is adjusted, which may lead to a result that the intensity of the reflection spectrum of the reference material is saturated. In this case, the reference material spectrum measurer 320 may adjust reflectance of the reference material to fifty percent (50%) so that the intensity of the reflection spectrum of the reference material is not saturated.

For example, the reference material may include a first plate where a fully reflective material is applied; and a second plate where a light-absorbing material is applied in the form of a pattern. The first and second plates overlap each other so that they can slide together. In this case, the reference material spectrum measurer 320 may adjust reflectance of the reference material through the first and second plates sliding together.

The pattern on the second plate may be stripes evenly spaced, but it is not limited thereto. In addition, the pattern and space of the light-absorbing material applied to the second plate may vary depending on an arrangement of a light source 110 and a light receiver 120 of the spectroscope 100.

In another example, the reference material is composed of one-hundred-percent reflectance material (a fully reflective material), and a film that is located on the top of the fully reflective material and capable of controlling a transparency thereof. In this case, the reference material spectrum measurer 320 may adjust reflectance of the reference material by adjusting the transparency of the film.

In yet another example, if the spectroscope 100 includes a plurality of light sources 110, the reference material spectrum measurer 320 may indirectly adjust reflectance of the reference material by reducing the number of light sources that are used in measuring a spectrum of the reference material.

In yet another example, the reference material spectrum measurer 320 may indirectly adjust reflectance of the reference material by adjusting the parameter of the spectroscope again, which has been adjusted by the parameter adjuster 310. When measuring a spectrum of the reference material, the reference material spectrum measurer 320 may indirectly adjust reflectance of the reference material by reducing, for example, a preamp coefficient of a light source, an integration time thereof, etc.

The reference material spectrum measurer 320 may measure a reflection spectrum of the reference material by using the spectroscope 100 whose parameter is adjusted. If the reflectance of the reference material has been changed, the reference material spectrum measurer 320 may measure a reflection spectrum of the reference material, whose reflectance has been changed.

For example, if a reference material having predetermined reflectance of which an intensity of a reflection spectrum is not saturated (e.g., reflectance of 50%) is determined, the reference material spectrum measurer 320 may also measure a reflection spectrum of the reference material having the predetermined reflectance without a process of adjusting the reflectance of the reference material.

If the adjusted reflectance of the reference material is not one hundred percent (100%), the first reference spectrum calculator 330 may calculate a first reference spectrum through the measured reflection spectrum of the reference material.

As described above, the first reference spectrum is used to calculate a transmittance, absorbance, etc. for a sample analysis (with reference to Equations 1 and 2). Here, the first reference spectrum is the spectrum of a reference material having reflectance of 100%; and the spectrum of a reference material, which is finally measured by the reference material spectrum measurer 320, is the spectrum of a reference material whose reflectance is adjusted (e.g., a reference material whose reflectance is adjusted to 50%). Thus, if the adjusted reflectance of the reference material is not one hundred percent (100%), the first reference spectrum calculator 330 calculates a first reference spectrum, which is the spectrum when the reflectance is one hundred percent (100%), based on the spectrum of the reference material whose reflectance has been adjusted.

The first reference spectrum calculator 330 may calculate the first reference spectrum by using a conversion formula that defines a relation of a spectrum depending on reflectance. Here, the conversion formula may be predefined using spectrums that are measured in advance depending on various reflectances.

The second reference spectrum measurer 340 may measure a second reference spectrum by using the spectroscope 100 whose parameter is adjusted, in a state in which a light source 110 is turned off.

Figure 4:
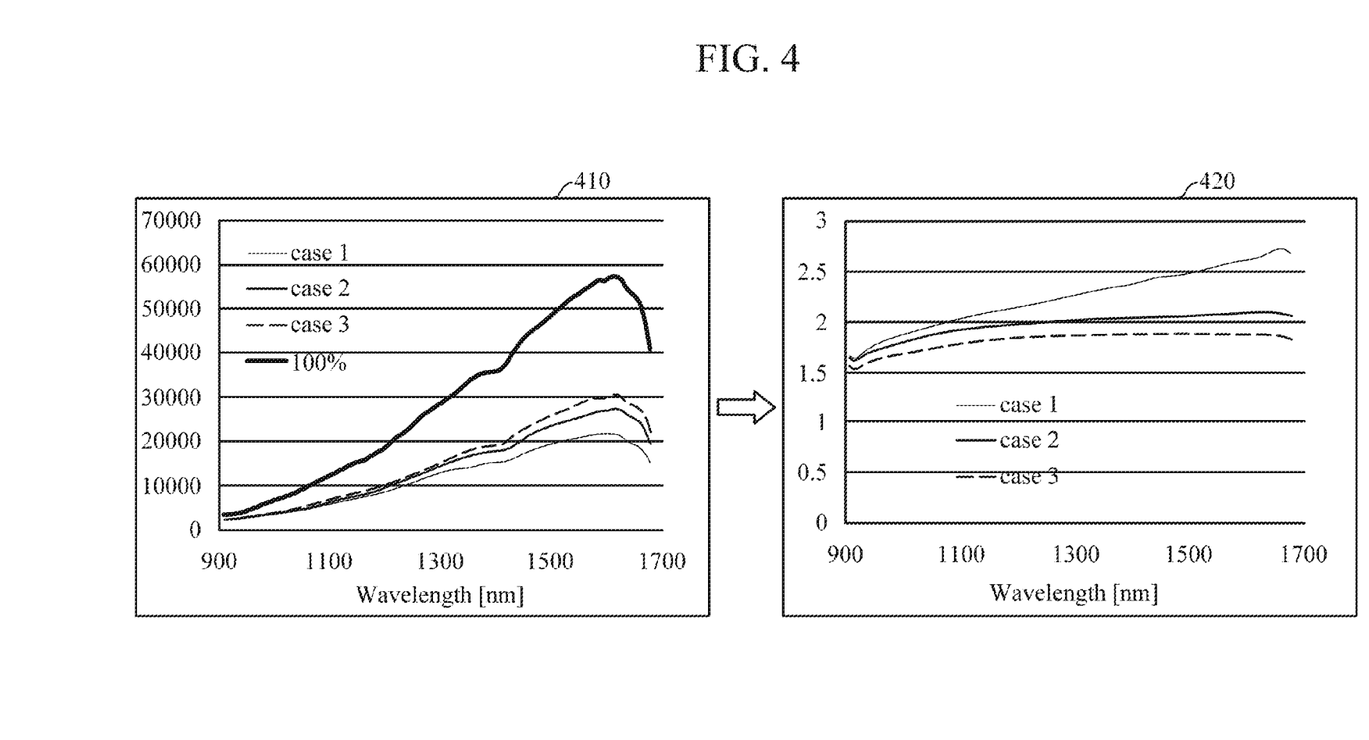
FIG. 4 is a diagram illustrating a conversion formula according to an exemplary embodiment.

FIG. 4 is a diagram illustrating a conversion formula according to an exemplary embodiment.

Here, a reference numeral 410 is the spectrum that is measured depending on various reflectances (cases 1 to 3); and a reference numeral 420 shows a conversion formula, which is defined based on the spectrum that is measured depending on various reflectances (cases 1 to 3).

Referring to FIG. 4, the conversion formula may be defined as a ratio of a spectrum when the reflectance is 100% to a spectrum of each reflectance.

Figure 5:
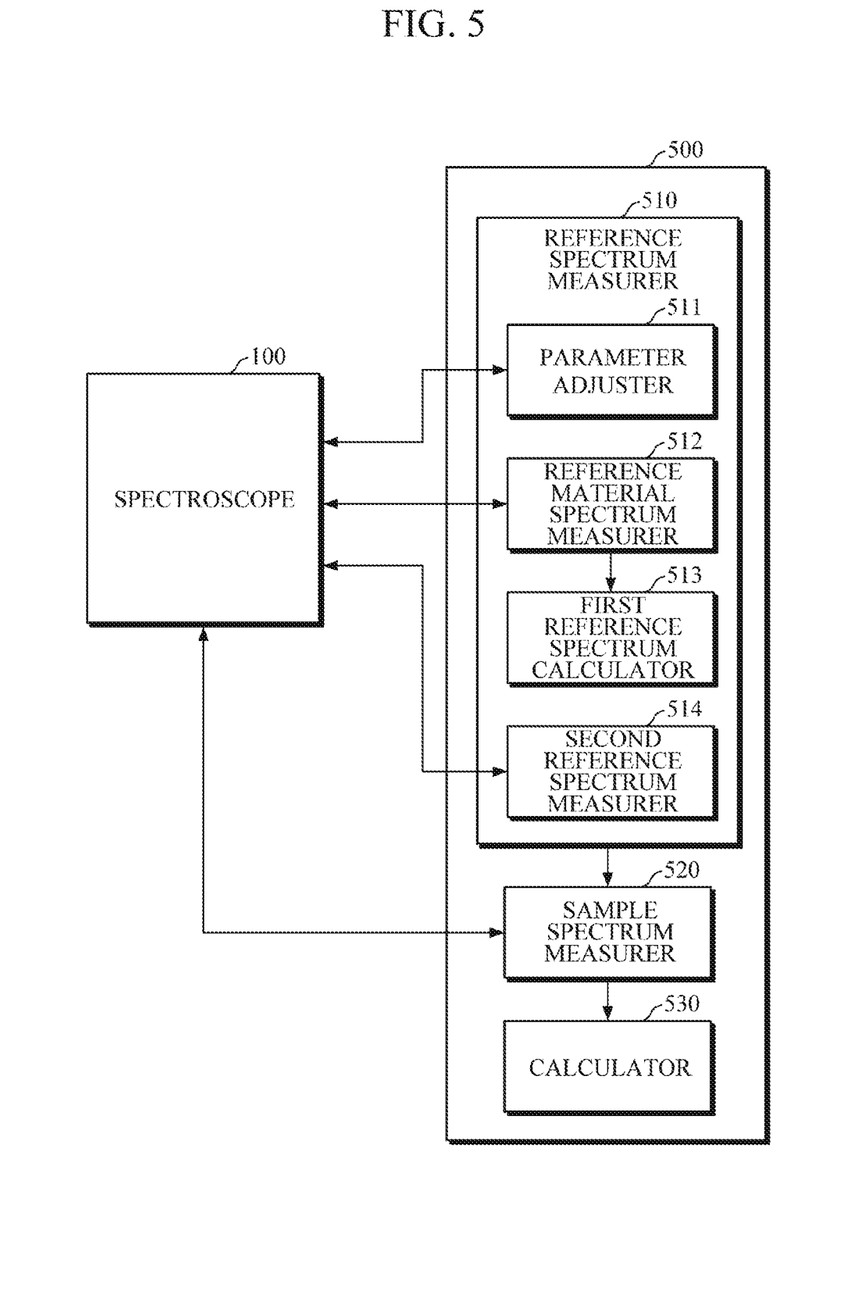
FIG. 5 is a diagram illustrating an apparatus for analyzing a sample, according to an exemplary embodiment.

FIG. 5 is a diagram illustrating an apparatus for analyzing a sample, according to an exemplary embodiment.

Referring to FIG. 5, an apparatus 500 for analyzing a sample includes a reference spectrum measurer 510, a sample spectrum measurer 520, and a calculator 530.

The reference spectrum measurer 510 may measure first and second reference spectrums. To this end, the reference spectrum measurer 510 includes a parameter adjuster 511, a reference material spectrum measurer 512, a first reference spectrum calculator 513, and a second reference spectrum measurer 514. The reference spectrum measurer 510 and each of the elements 511 to 514 thereof are the same as the apparatus 300 for measuring reference spectrums, which is illustrated in FIG. 3, so its detailed description is omitted.

The sample spectrum measurer 520 may measure a reflection spectrum of a sample by using the spectroscope 100 whose parameter is adjusted by a parameter adjuster 511.

Accordingly, the apparatus 500 may measure the reflection spectrum of the sample by using a performance of the spectroscope.

The calculator 530 may calculate transmittance, reflectance, absorbance, etc., of a sample based on the following spectrums: a reflection spectrum of the sample, which is measured by the sample spectrum measurer 520; a first reference spectrum calculated by the first reference spectrum calculator 513; and a second reference spectrum measured by the second reference spectrum measurer 514.

If the absolute value of a transmittance, reflectance, or absorbance is not important when the sample is analyzed, the apparatus 500 may not calculate the first reference spectrum, but calculate newly defined absorbance by using Equation 3, which is then used in analyzing the sample.

$$A^* = -\log_{10}\left(\frac{I_s - I_{dark}}{I_k - I_{dark}}\right)$$ [Equation 3]

Here, $I_s$ indicates an intensity of a sample spectrum; $I_{dark}$, an intensity of a second reference spectrum; and $I_k$, an intensity of a spectrum when the reflectance is k %

Figure 6:
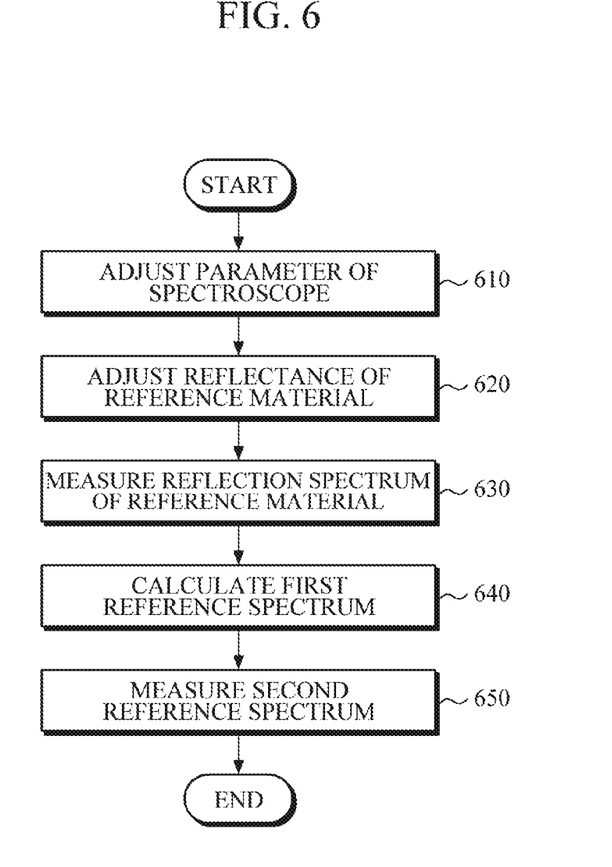
FIG. 6 is a flowchart illustrating a method of measuring reference spectrums, according to an exemplary embodiment.

FIG. 6 is a flowchart illustrating a method of measuring reference spectrums, according to an exemplary embodiment.

Referring to FIGS. 3 to 6, the apparatus 300 for measuring a reference spectrum adjusts a parameter of a spectroscope in operation 610 so that an intensity of a reflection spectrum of the sample has a value in a predetermined range. Here, the parameter of the spectroscope may include a preamp coefficient of the light source, an integration time thereof, a scan number thereof, a resolution thereof, etc. The predetermined range may, for example, be determined in advance to use a performance of the spectroscope.

The apparatus 300 adjusts reflectance of a reference material in operation 620 so that an intensity of the reflection spectrum of the reference material is not saturated.

In a case in which an intensity of a sample spectrum is increased through an adjustment of the parameter of the spectroscope 100, an intensity of a first reference spectrum being measured also rises. Thus, depending on the situation, the intensity of the first reference spectrum exceeds a range that the spectroscope 100 can measure, thereby causing the saturation thereof. Accordingly, the apparatus 300 adjusts the reflectance of the reference material so that the intensity of the reflection spectrum of the reference material is not saturated.

For example, the reference material may include a first plate where a fully reflective material is applied; and a second plate where a light-absorbing material is applied in the form of a pattern. The first and second plates overlap each other so that they can slide together. In this case, the apparatus 300 may adjust reflectance of the reference material through the first and second plates sliding together.

The pattern on the second plate may be stripes evenly spaced, but it is not limited thereto. In addition, the pattern and space of the light-absorbing material applied to the second plate may vary depending on an arrangement of a light source and a light receiver of the spectroscope 100.

In another example, the reference material is composed of one-hundred-percent reflectance material (a fully reflective material), and a film that is located on the top of the fully reflective material and capable of controlling a transparency thereof. In this case, the apparatus 300 may adjust reflectance of the reference material by adjusting the transparency of the film.

In yet another example, if the spectroscope 100 includes a plurality of light sources, the reference material spectrum measurer 320 may indirectly adjust reflectance of the reference material by reducing the number of light sources that are used in measuring a spectrum of the reference material.

In yet another example, the apparatus 300 may indirectly adjust reflectance of the reference material by adjusting the parameter of the spectroscope again, which has been adjusted in operation 610 as described above. When measuring a spectrum of the reference material, the apparatus 300 may indirectly adjust reflectance of the reference material by reducing, for example, a preamp coefficient of a light source, an integration time thereof, etc.

In operation 630, the apparatus 300 measures the reflection spectrum of the reference material having changed reflectance by using the spectroscope 100 whose parameter has been adjusted.

For example, if a reference material having predetermined reflectance of which an intensity of a reflection spectrum is not saturated (e.g., reflectance of 50%) is determined, the apparatus 300 may also measure a reflection spectrum of the reference material having the predetermined reflectance without a process of adjusting the reflectance of the reference material.

If the adjusted reflectance of the reference material is not one hundred percent (100%), the apparatus 300 may calculate a first reference spectrum through the measured reflection spectrum of the reference material in operation 640.

The apparatus 300 may calculate the first reference spectrum by using a conversion formula that defines a relation of a spectrum depending on reflectance. Here, the conversion formula may be predefined using spectrums that are measured in advance depending on various reflectances.

The apparatus 300 may measure a second reference spectrum, in operation 650, by using the spectroscope 100 whose parameter is adjusted, in a state in which a light source is turned off.

Figure 7:
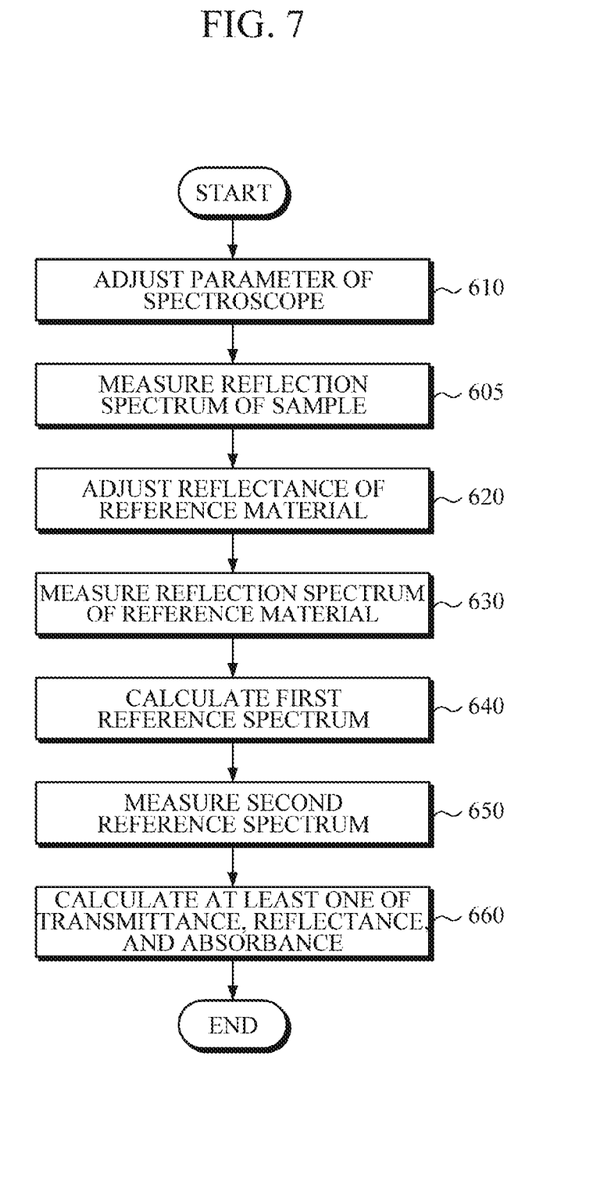
FIG. 7 is a flowchart illustrating a method of analyzing a sample, according to an exemplary embodiment.

FIG. 7 is a flowchart illustrating an example of a method of analyzing a sample.

In comparison to FIG. 6 illustrating a method of measuring a reference spectrum, a method of analyzing a sample in FIG. 7 further includes operation 605 of measuring a reflection spectrum of a sample, and operation 660 of calculating at least one among transmittance, reflectance, or absorbance.

In operation 605, the apparatus 500 for analyzing a sample measures a reflection spectrum of a sample by using the spectroscope 100 whose parameter is adjusted.

Accordingly, the apparatus 500 may measure the reflection spectrum of the sample to use a performance of the spectroscope.

In operation 660 of calculating at least one among the transmittance, reflectance, or absorbance, the apparatus 500 may calculate at least one among the transmittance, reflectance, or absorbance of the sample based on the following spectrums: a reflection spectrum of the sample, which is measured in operation 605; a first reference spectrum, which is calculated in operation 640; and a second reference spectrum, which is measured in operation 650.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it may be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for measuring a reference spectrum for a sample analysis, the apparatus comprising:
   a parameter adjuster configured to adjust a parameter of a spectroscope so that an intensity of a reflection spectrum of a sample to be analyzed by the spectroscope has a value in a range;
   a reference material spectrum measurer configured to:
   adjust reflectance of a reference material so that an intensity of a reflection spectrum of the reference material is not saturated; and measure the reflection spectrum of the reference material, using the spectroscope having the adjusted parameter;
a first reference spectrum calculator configured to, in response to the adjusted reflectance of the reference material not being one hundred percent, calculate a first reference spectrum based on the measured reflection spectrum of the reference material; and
a second reference spectrum measurer configured to measure a second reference spectrum of the reference material, using the spectroscope having the adjusted parameter, in response to a light source of the spectroscope being turned off.

2. The apparatus of claim 1, wherein the range is determined to maximize a performance of the spectroscope.

3. The apparatus of claim 1, wherein the parameter of the spectroscope comprises at least one of a preamp coefficient of the light source, an integration time of the light source, a scan number of the light source, and a resolution of the light source.

4. The apparatus of claim 1, wherein the reference material comprises a first plate where a fully reflective material is applied, and a second plate where a light-absorbing material is applied as a pattern, the first plate overlapping the second plate to slide together, and
the reference material spectrum measurer is further configured to adjust the reflectance of the reference material through the first plate and the second plate sliding together.

5. The apparatus of claim 1, wherein the reference material comprises a fully reflective material, and a film disposed on the fully reflective material and configured to adjust a transparency of the fully reflective material, and
the reference material spectrum measurer is further configured to adjust the reflectance of the reference material by adjusting the transparency of the film.

6. The apparatus of claim 1, wherein the reference material spectrum measurer is further configured to adjust the reflectance of the reference material by reducing a number of light sources of the spectroscope to be used in the measurement of the reflection spectrum of the reference material, or readjusting the adjusted parameter of the spectroscope.

7. The apparatus of claim 1, wherein the first reference spectrum calculator is further configured to calculate the first reference spectrum, using a conversion formula defining a relation of a spectrum depending on reflectance.

8. A method of measuring a reference spectrum for a sample analysis, the method comprising:
adjusting a parameter of a spectroscope so that an intensity of a reflection spectrum of a sample to be analyzed by the spectroscope has a value in a range;
adjusting reflectance of a reference material so that an intensity of a reflection spectrum of the reference material is not saturated;
measuring the reflection spectrum of the reference material, using the spectroscope having the adjusted parameter;
in response to the adjusted reflectance of the reference material not being one hundred percent, calculating a first reference spectrum based on the measured reflection spectrum of the reference material; and
measuring a second reference spectrum of the reference material, using the spectroscope having the adjusted parameter, in response to a light source of the spectroscope being turned off.

9. The method of claim 8, wherein the range is determined to maximize a performance of the spectroscope.

10. The method of claim 8, wherein the parameter of the spectroscope comprises any one or any combination a preamp coefficient of the light source, an integration time of the light source, a scan number of the light source, and a resolution of the light source.

11. The method of claim 8, wherein the reference material comprises a first plate where a fully reflective material is applied, and a second plate where a light-absorbing material is applied as a pattern, the first plate overlapping the second plate to slide together, and
the adjusting of the reflectance of the reference material comprises adjusting the reflectance of the reference material through the first plate and the second plate sliding together.

12. The method of claim 8, wherein the reference material comprises a fully reflective material, and a film disposed on the fully reflective material and configured to adjust a transparency of the fully reflective material, and
the adjusting of the reflectance of the reference material comprises adjusting the reflectance of the reference material by adjusting the transparency of the film.

13. The method of claim 8, wherein the adjusting of the reflectance of the reference material comprises adjusting the reflectance of the reference material by reducing a number of light sources of the spectroscope to be used in the measurement of the reflection spectrum of the reference material, or readjusting the adjusted parameter of the spectroscope.

14. The method of claim 8, wherein the calculating of the first reference spectrum comprises calculating the first reference spectrum, using a conversion formula defining a relation of a spectrum depending on reflectance.

15. An apparatus for analyzing a sample, the apparatus comprising:
a parameter adjuster configured to adjust a parameter of a spectroscope so that an intensity of a reflection spectrum of a sample to be analyzed by the spectroscope has a value in a range;
a sample spectrum measurer configured to measure the reflection spectrum of the sample, using the spectroscope having the adjusted parameter;
a reference material spectrum measurer configured to:
adjust reflectance of a reference material so that an intensity of a reflection spectrum of the reference material is not saturated; and
measure the reflection spectrum of the reference material, using the spectroscope having the adjusted parameter;
a first reference spectrum calculator configured to, in response to the adjusted reflectance of the reference material not being one hundred percent, calculate a first reference spectrum based on the measured reflection spectrum of the reference material;
a second reference spectrum measurer configured to measure a second reference spectrum of the reference material, using the spectroscope having the adjusted parameter, in response to a light source of the spectroscope being turned off; and
a calculator configured to calculate any one or any combination of transmittance, reflectance, or absorbance based on the reflection spectrum of the sample, the first reference spectrum, and the second reference spectrum.

16. The apparatus of claim 15, wherein the range is determined to maximize a performance of the spectroscope.

17. The apparatus of claim 15, wherein the parameter of the spectroscope comprises at least one of a preamp coefficient of the light source, an integration time of the light source, a scan number of the light source, and a resolution of the light source.

18. The apparatus of claim 15, wherein the reference material comprises a first plate where a fully reflective material is applied, and a second plate where a light-absorbing material is applied as a pattern, the first plate overlapping the second plate to slide together, and the reference material spectrum measurer is further configured to adjust the reflectance of the reference material through the first plate and the second plate sliding together.

19. The apparatus of claim 15 wherein the reference material comprises a fully reflective material, and a film disposed on the fully reflective material and configured to adjust a transparency of the fully reflective material, and the reference material spectrum measurer is further configured to adjust the reflectance of the reference material by adjusting the transparency of the film.

20. The apparatus of claim 15, wherein the reference material spectrum measurer is further configured to adjust the reflectance of the reference material by reducing a number of light sources of the spectroscope to be used in the measurement of the reflection spectrum of the reference material, or readjusting the adjusted parameter of the spectroscope.

* * * * *